United States Patent [19]
Marcy

[11] Patent Number: 5,472,222
[45] Date of Patent: Dec. 5, 1995

[54] HITCH FOR GOOSE NECK TRAILER

[76] Inventor: Dewey R. Marcy, 24576 Weld County Rd. 64, Greeley, Colo. 80631

[21] Appl. No.: 300,397

[22] Filed: Sep. 2, 1994

[51] Int. Cl.$^6$ .............................. B60D 1/06; B60D 1/52
[52] U.S. Cl. ................... 280/433; 280/491.5; 280/901; 280/511
[58] Field of Search ................. 280/415.1, 423.1, 280/433, 438.1, 491.1, 491.5, 504, 511, 901

[56] References Cited

U.S. PATENT DOCUMENTS

| | | | |
|---|---|---|---|
| 3,336,051 | 8/1967 | Dale | 280/901 X |
| 4,657,274 | 4/1987 | Mann et al. | 280/433 |
| 4,921,266 | 5/1990 | Beals | 280/901 X |
| 5,016,898 | 5/1991 | Works et al. | 280/433 |
| 5,104,138 | 4/1992 | Allen | 280/433 |
| 5,143,393 | 9/1992 | Meyer | 280/901 X |
| 5,145,199 | 9/1992 | Howard | 280/901 X |
| 5,246,244 | 9/1993 | Colibert | 280/495 |

Primary Examiner—Kevin T. Hurley
Attorney, Agent, or Firm—Fields, Lewis, Rost & Smith

[57] ABSTRACT

A hitch for a goose neck trailer is provided which includes a cross member positionable beneath the cargo bed and between the frame members of a truck. A central opening is provided on the cross member for receiving a socket that is insertable within a sleeve member aligned with the opening. A spring biased pin attached to the sleeve engages a vertical groove formed on the exterior of the socket to secure the ball socket for use. A ball hitch attached to an upper end of the socket protrudes above the cargo bed and is attachable to a goose neck trailer. Removal of the ball hitch and socket is accomplished by aligning the pin with an eccentric groove formed on the socket's exterior, rotating the socket to an area where the groove ends, and pulling upwards. Adjustment means are provided to adjust the hitch to accommodate differing frame and cargo bed configurations found on trucks. The ball hitch may be stored by inverting the ball hitch and socket, aligning the vertical groove with the pin, and inserting the ball hitch end into the central opening.

14 Claims, 4 Drawing Sheets

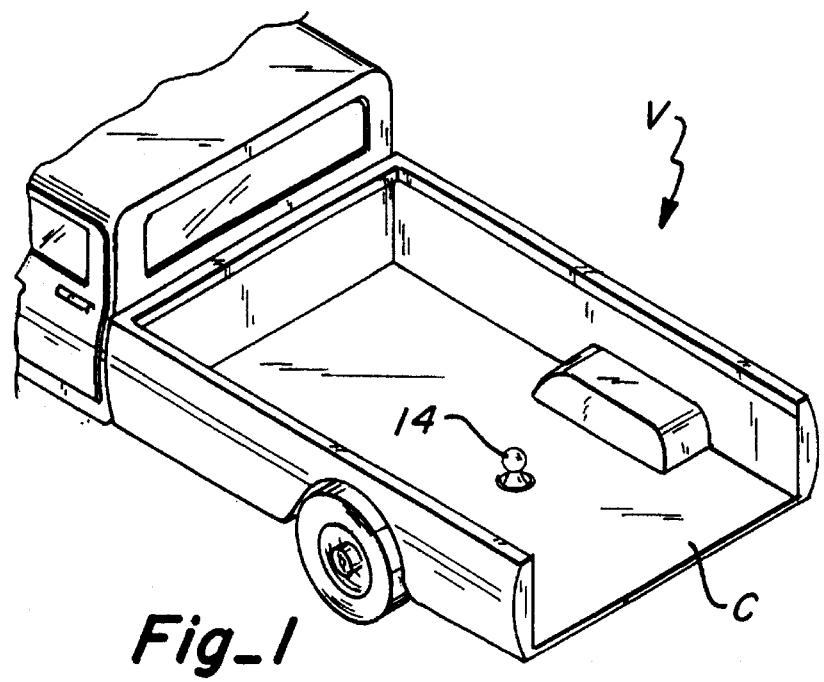
Fig_1
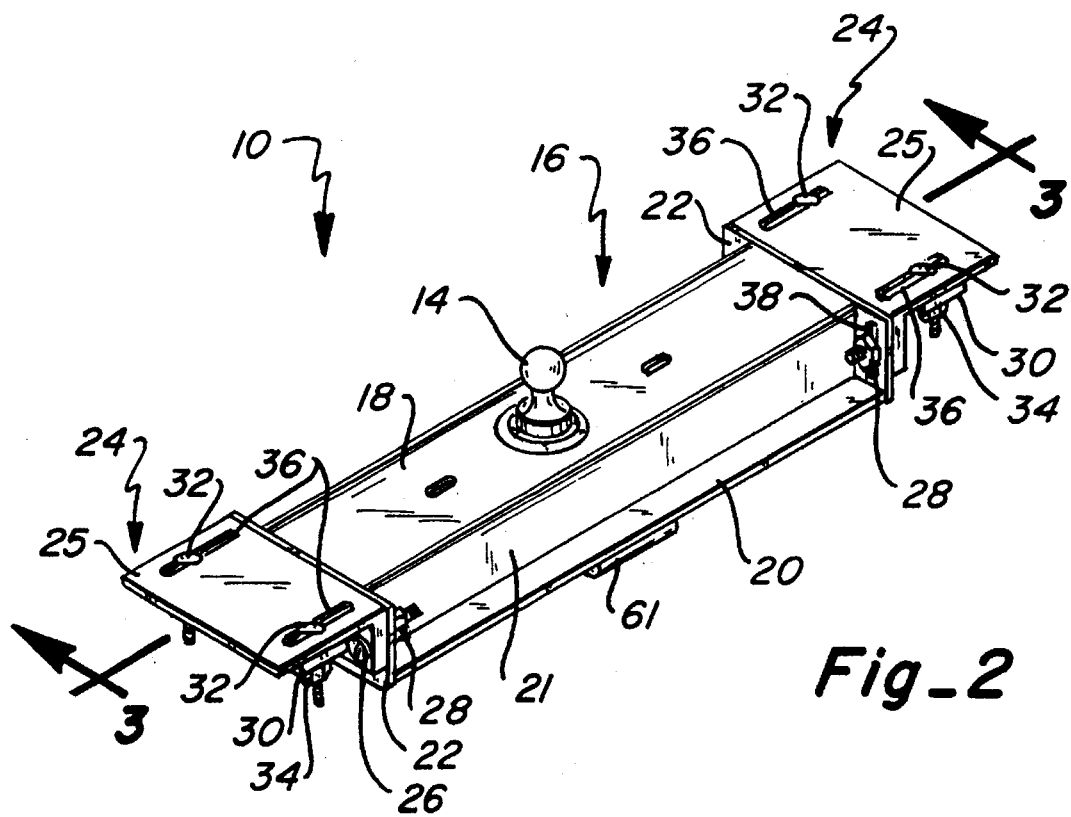
Fig_2

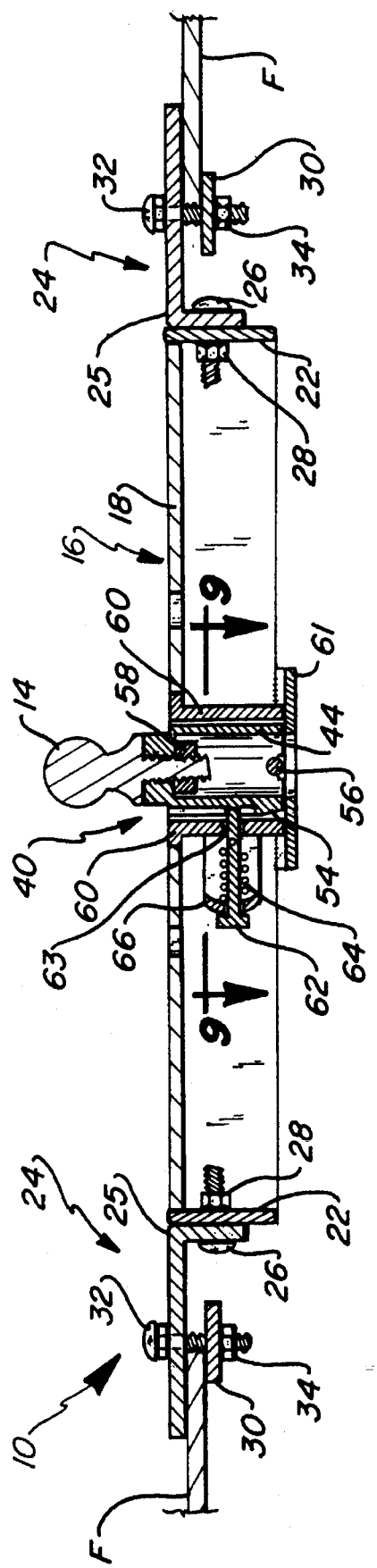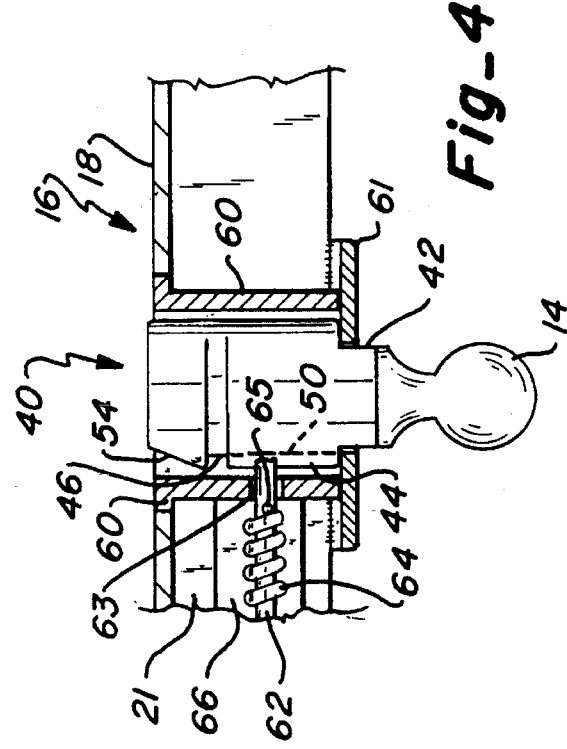

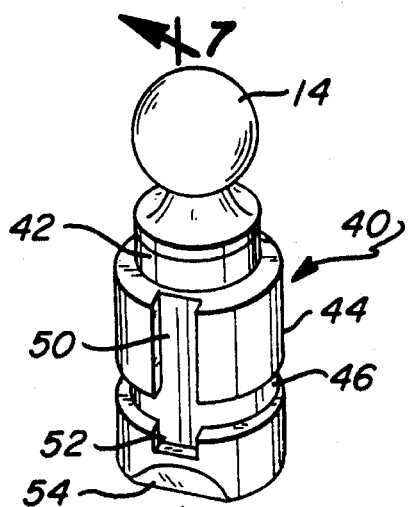
Fig_5
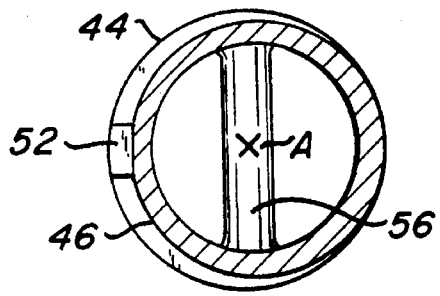
Fig_5A
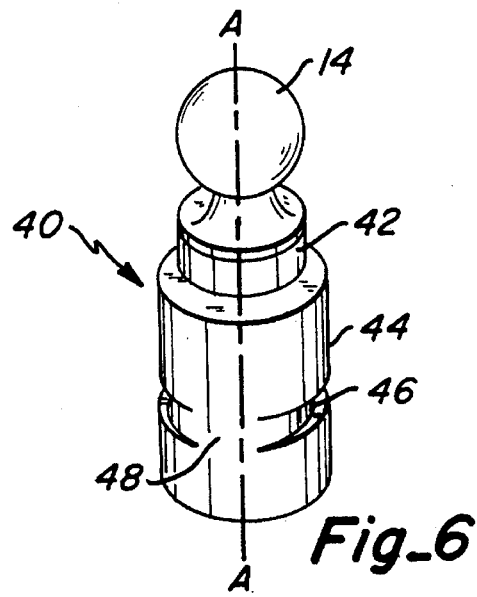
Fig_6
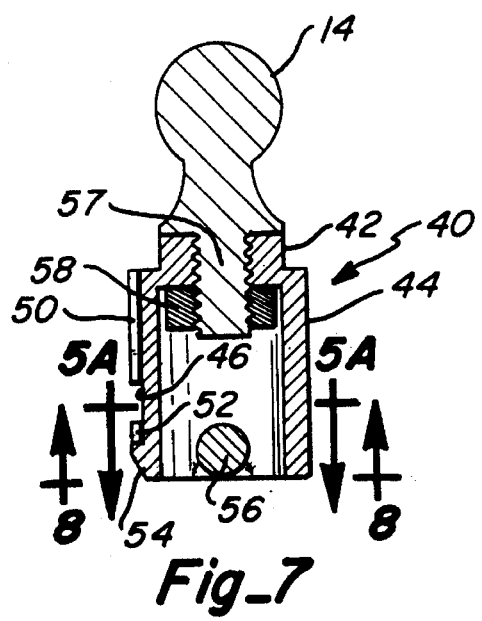
Fig_7
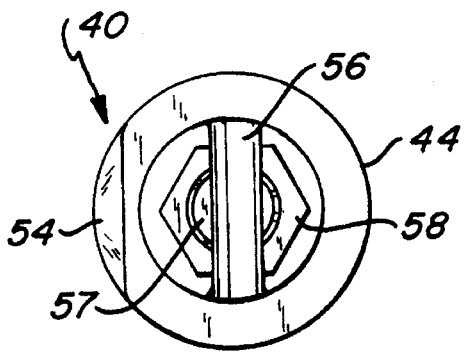
Fig_8

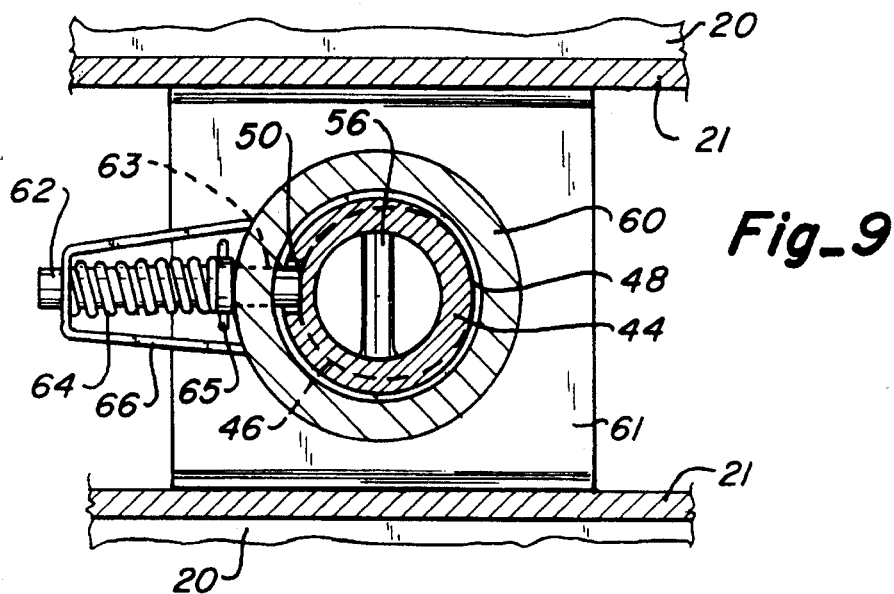
Fig_9
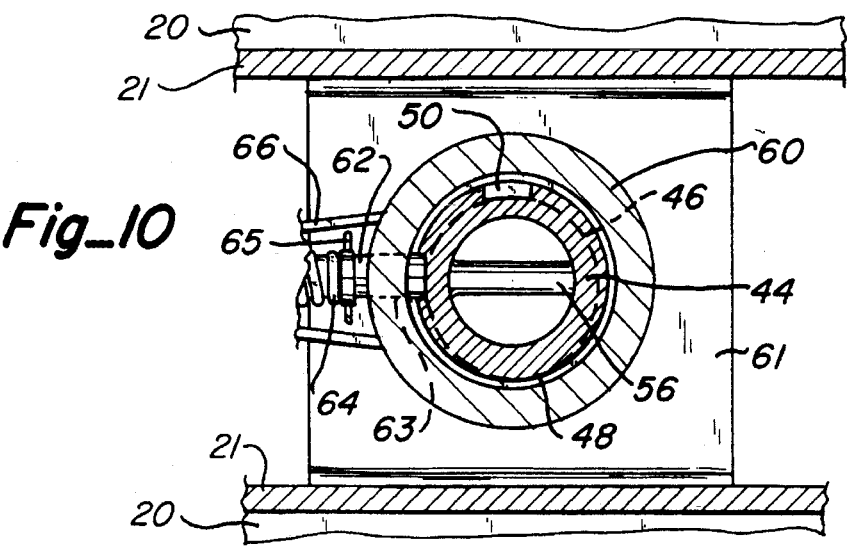
Fig_10
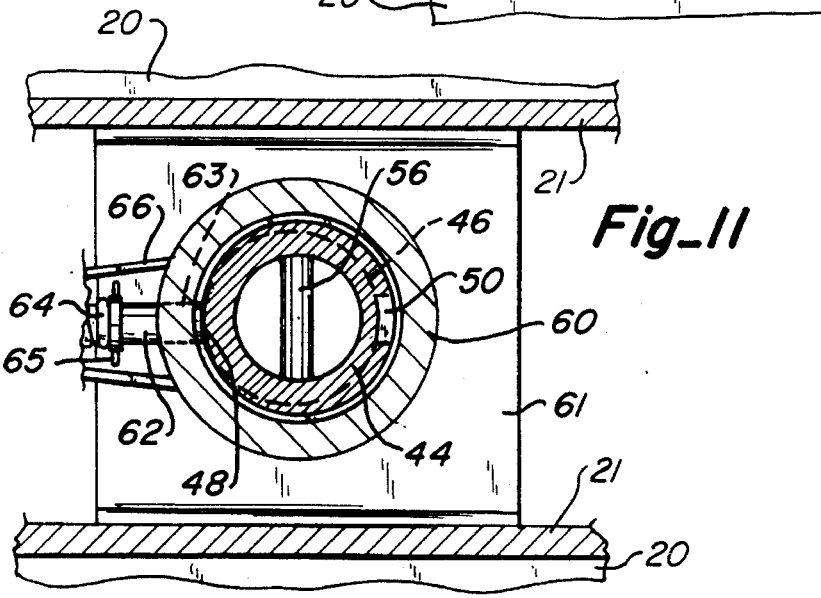
Fig_11

HITCH FOR GOOSE NECK TRAILER

TECHNICAL FIELD

This invention relates to a trailer hitch assembly and particularly one for use with the cargo bed of a towing vehicle.

BACKGROUND ART

The design and construction of a trailer hitch assembly for use with the cargo bed of a vehicle presents inherent problems such as installation of the hitch assembly and manipulation of the ball hitch for use and storage. Typically, a trailer hitch assembly mounted on the cargo bed of a vehicle is used to secure a large trailer. The weight of the trailer requires the hitch assembly to be of substantial construction to adequately distribute and carry the load. The prior art primarily discloses trailer hitches that are structurally complex and that require installation by a blacksmith or other skilled artisan. Also typical of the prior art is that the ball hitch requires the use of some tool or mechanical device for manipulating the ball hitch to a position for use or storage.

A conventional trailer hitch for use on the cargo bed of a vehicle is disclosed in U.S. Pat. No. 5,016,898 to Works et al. This device includes a ball hitch selectively positioned within a retention sleeve mounted below and through the cargo bed of a vehicle. A locking pin secures the ball hitch in either an upright position wherein the ball hitch is ready for use, or in an inverted position for storing the ball hitch while not in use. This device is satisfactory for its intended purpose, however, the ball hitch is not easily installed or removed because the use of a locking handle located outside the cargo bed of the vehicle is required. Thus, the locking handle must first be operated prior to manipulating the ball hitch to a position for use or storage.

Additional prior art disclosing trailer hitches having a locking handle connected to a locking pin includes U.S. Pat. No. 5,104,138 to Allen and U.S. Pat. No. 4,657,274 to Mann et al. These inventions also require an operator to first release the locking pin by engaging an external locking handle and then reaching into the cargo bed to manipulate positioning of the ball hitch.

U.S. Pat. No. 5,246,244 to Colibert discloses a hitch assembly that requires the use of a lever inserted through an aperture in the ball hitch in order to position it for use or storage.

Although each of these trailer hitches are satisfactory for their intended purpose, none of them are as simple in construction nor do they provide the degree of ease in manipulation of the ball hitch as the invention set forth herein.

DISCLOSURE OF THE INVENTION

In accordance with this invention, a trailer hitch assembly for use in the cargo bed of a vehicle is provided. The hitch includes a cross-member which may be directly mounted to the parallel spaced frame members located below the cargo bed of the vehicle. Thus, installation of the hitch assembly does not require the expertise of an artisan nor does installation require special tools.

The cross-member includes a load bearing plate which is positioned flush with the underside of the cargo bed. The cross-member is connected to the vehicle frame members by corresponding brackets and clamping plates which may be adjusted in both a horizontal and vertical distance. Thus, the cross-member may be adjustably mounted to fit differing frame member configurations and sizes encountered on different vehicles. Formed on the load bearing plate is an opening which is alignable with a sleeve member positioned under the plate. A hole is drilled through the cargo bed corresponding to the opening in the load bearing plate. A spring biased pin is mounted to the sleeve wherein the pin is insertable into the sleeve by means of a hole formed in a side wall of the sleeve. A lower end of a socket is then insertable within the sleeve wherein the retaining pin secures the socket to the cross-member. A ball hitch connected to the upper end of the socket is attachable to a trailer when the socket is secured to the cross-member.

The socket has a vertical groove and an intersecting eccentric groove formed on the exterior surface of the socket. The vertical groove has a uniform depth while the eccentric groove has a tapering depth as the socket is rotated about its vertical axis. The eccentric groove is deepest at the intersection with the vertical groove and tapers to an area which is flush with the exterior surface of the socket.

Formed on the lower end of the socket is a cambered surface. As the socket is inserted into the sleeve, the cambered surface cams the spring biased pin allowing it to be engaged within the vertical groove when the socket is fully seated into the opening. In this position, the ball hitch is ready for attachment to a trailer. When it is desired to remove the ball hitch, the ball hitch is lifted or pulled so that the vertical groove moves along the retaining pin until the retaining pin is aligned with the eccentric groove. The ball hitch is then rotated so that the eccentric groove moves along the retaining pin until the pin opposes the flush area of the eccentric groove thereby causing the retaining pin to be retracted against the force of the spring. The socket is then removed from the sleeve by pulling upwards on the ball hitch. The ball hitch may be stored by simply inverting the socket, aligning the pin with the vertical groove, and inserting the ball hitch into the sleeve. In this position, the normally lower end of the socket is flush with the top side of the cargo bed.

Additional advantages of this invention will become apparent from the description which follows, taken in conjunction with the accompanying drawings.

BRIEF DESCRIPTION OF THE DRAWINGS

FIG. 1 is a perspective view of a vehicle showing the ball hitch of the present invention extending upwardly through the cargo bed of the vehicle;

FIG. 2 is a perspective view of the present invention showing the ball hitch and socket installed in the cross-member;

FIG. 3 is an enlarged horizontal section taken along line 3—3 of FIG. 2, showing the internal construction of the socket inserted within the sleeve and engaged by the spring-biased retaining pin;

FIG. 4 is an enlarged fragmentary horizontal section of a portion of FIG. 3, but showing the ball hitch and socket in the storage position;

FIG. 5 is a front perspective view of the socket and ball hitch, showing the relationship of the vertical and eccentric grooves;

FIG. 5A is a cross-sectional view of the socket, taken along line 5—5 of FIG. 7, showing the eccentric groove in relationship with vertical axis A—A;

FIG. 6 is rear perspective view of the socket and ball hitch, showing the eccentric groove as it tapers to an area flush with the exterior surface of the socket;

FIG. 7 is a vertical section of the socket and ball hitch, taken along line 7—7, of FIG. 5 showing the internal construction of the ball hitch secured to the socket;

FIG. 8 is a bottom view of the socket and ball hitch taken along line 8—8 of FIG. 7;

FIG. 9 is an enlarged fragmentary horizontal section, taken along line 9—9 of FIG. 3, showing the ball hitch and socket inserted within the sleeve and the retaining pin engaged with the vertical groove;

FIG. 10 is a fragmentary horizontal section similar to FIG. 9 but showing the socket inserted within the sleeve wherein the socket has been rotated approximately 90° with the retaining pin still engaged with the eccentric groove; and FIG. 11 is a fragmentary horizontal section similar to FIGS. 9 and 10 but showing the socket inserted within the sleeve wherein the socket has been rotated approximately 180° such that the retaining pin opposes the tapered end of the eccentric groove that is flush with the exterior surface of the socket.

DETAILED DESCRIPTION OF THE INVENTION

As seen in FIG. 1, a utility vehicle V, such as a pickup truck, includes a cargo bed C in which a ball hitch 14 of the present invention protrudes upwardly through the cargo bed C.

Referring to FIG. 2, the trailer hitch assembly 10 includes a cross-member 16 having a load bearing plate 18 and two depending vertical side plates 21 attached thereto resulting in a channel shaped structure. Each vertical side plate 21 has attached to it a horizontal flange 20. Each end of the cross-member 16 has an attached end plate 22 which serves as the surface for attachment of an L-shape bracket 24. Bracket 24 is secured to end plate 22 by means of end plate bolts 26 and nuts 28. Attached to each L-shape bracket 24 is a flat clamping plate 30 that is positioned in parallel with the upper plate 25 of bracket 24. Clamping plate 30 is secured to bracket 24 by means of clamping bolts 32 and corresponding clamping nuts 34.

Vertical slots 38 are formed in end plate 22 to allow for selective vertical adjustment of the bracket 24 in relation to the cross-member 16. Similarly, horizontal slots 36 are formed in upper plate 25 to allow selective horizontal adjustment of the clamping plate 30 with respect to the upper plate 25.

As shown in FIG. 3, the cross-member 16 is mounted to the frame members F of the vehicle. Upper plates 25 of L-shape brackets 24 are positioned on top of the frame members F and clamping nuts 34 are tightened in order that clamping plates 30 engage the bottom side of the frames F. Tightening clamping nuts 34 firmly secures cross-member 16 to the frame members F of the vehicle. Depending upon the horizontal distance between frame members F, clamping bolts 32 may be selectively positioned in slots 36 such that the clamping plates 30 can engage the frame members F. Similarly, depending upon the vertical distance between frame members F and cargo bed C, end plate bolts 26 may be selectively positioned in slots 38 such that the load bearing plate 18 is flush with the bottom side of the cargo bed C.

As seen in FIG. 5, a socket 40 includes a protruding neck portion 42 and a body portion 44 having a slightly larger diameter than neck portion 42. Formed on the exterior surface of the body portion 44 is a generally horizontal circumferential eccentric groove 46 which extends peripherally around a substantial portion of the socket 40. As shown in FIGS. 5A and 6, the eccentric groove 46 is formed about vertical axis A—A which passes through the center of the circular cross-section of body portion 44. As shown in FIG. 6, the eccentric groove 46 gradually tapers to an area where the groove ends and thus becomes flush with the exterior surface of body portion 44. Communicating with eccentric groove 46 is an intersecting longitudinal vertical groove 50 of uniform depth which extends above and below the horizontal plane defined by the deepest portion of groove 46. Vertically aligned longitudinally with groove 50 is a cambered surface 54 formed on the lower end of socket 40. Conveniently, vertical groove 50 and eccentric groove 46 are the same depth at their intersection.

As best seen in FIGS. 7 and 8, ball hitch 14 includes a threaded portion 57 that is inserted within the interior of socket 40 and is secured thereto by means of ball hitch nut 58. Socket 40 further includes an integrally formed transverse handle 56 which extends across the diameter of the socket 40 at its lower end. If desired, ball hitch 14 and socket 40 can be made in one piece.

Referring to FIGS. 4 and 9–11, the cross-member 16 further includes a cylindrical sleeve 60 whose upper end is aligned with the opening formed in plate 18, and a bottom retaining plate 61 that attaches to flanges 20. The sleeve 60 is positioned between the load bearing plate 18 and bottom retaining plate 61. A hole 63 is formed in the side wall of sleeve 60 for receiving a retaining pin 62 which extends radially into the interior space of sleeve 60. A pin support 66 attached to the exterior side of sleeve 60 secures the pin 62 in aligned position with hole 63. A biasing means, such as a common coil spring 64, is placed over the retaining pin 62 and positioned between pin support 66 and spring pin 65. The force of spring 64 causes the pin 62 to be resiliently positioned into the interior space of sleeve 60.

To install the ball hitch, the lower end of socket 40 is inserted within sleeve 60 wherein the cambered surface 54 is aligned with pin 62. Cambered surface 54 cams the pin 62 causing it to retract. As the socket 40 is further inserted, the pin 62 is engaged with the lower portion of vertical groove 50. Upon further insertion, the pin 62 is engaged with the upper portion of vertical groove 50 wherein the socket 40 and ball hitch 14 are securely mounted to the cross-member 16 and cannot rotate because of the engagement of pin 62 with vertical groove 50. To remove the ball hitch 14, the socket 40 is lifted to an elevation where the pin 62 is aligned with eccentric groove 46. The socket 40 is then rotated in sleeve 60 approximately 180°, as shown in FIG. 11, wherein the pin 62 directly opposes the tapered end of eccentric groove 46. The rotation of the socket 40 causes pin 62 to be retracted due to the decreasing depth of eccentric groove 46. In this position, the pin 62 is no longer engaged within groove 46 and the socket 40 may be removed by simply pulling upwards on the ball hitch 14. Although the preferred embodiment shows the eccentric groove 46 formed peripherally along substantially all of the socket 40, it will be understood that groove 46 can be formed, for example, along a 90° portion whereby removal of the socket only requires a rotation of 90°.

Normally, a trailer will exert a downward force on the ball hitch 14. However, the ball hitch 14 sometimes experiences an upward pull by the trailer when traveling over bumpy terrain or if the load in the trailer is not properly balanced. To ensure that the eccentric groove 46 is not damaged and that the ball hitch cannot rotate under such negative loading conditions, lower portion 52 of vertical groove 50 is provided to receive the retaining pin 62 and provide a stop so that the ball hitch cannot be pulled from socket 40.

Conveniently, as shown in FIG. 4, the ball hitch 14 may be stored by simply inverting the socket 40 and inserting the ball hitch 14 into the sleeve 60 by aligning the vertical groove 50 with the retaining pin 62. In this position, the normally lower end of the socket 40 is flush with the top side of cargo bed C.

Although the preferred embodiment illustrates a vertical groove 50 and an eccentric horizontal groove 46, it will be understood by those skilled in the art that varying combinations of two grooves may be utilized which falls within the scope of this invention. For example, a substantially vertical groove can be provided in conjunction with an intersecting and tapering eccentric groove which extends around the socket in a spiral direction having a substantial horizontal component.

From the foregoing, the advantages of this invention are readily apparent. A trailer hitch of simple construction has been provided for use on a common utility vehicle. The construction of the cross-member is such that the trailer hitch assembly may be readily mounted to vehicles which have varying frame and cargo bed configurations. The novel feature of a socket having a vertical groove and intersecting eccentric groove is provided that allows a ball hitch to be positioned for use and storage without the need for incorporating additional structure within the cross-member and without having to use external tools.

This invention has been described in detail with reference to a particular embodiment thereof, but it will be understood that various other modifications can be effected within the spirit and scope of this invention.

I claim:

1. A trailer hitch securable to a vehicle having a pair of parallel spaced frame members and a cargo bed, said hitch comprising:

a cross-member having first and second ends positionable between and attachable to the frame members of the vehicle; said cross-member having a centrally located opening;

a sleeve portion including a cylindrical side wall alignable within said opening, said sleeve having a hole formed on said wall;

a retractable retaining pin mounted on said sleeve portion insertable through said hole;

a socket having an exterior surface, an upper end and a lower end, said lower end having a cambered surface formed thereon, and a vertical groove and an intersecting eccentric groove formed on said exterior surface of said socket, said eccentric groove having a tapered end that is flush with said exterior surface, said cambered surface and said vertical groove being vertically aligned; and a ball hitch attached to said upper end of said socket, said ball hitch being attachable to a trailer, said socket being attachable to said cross-member by aligning said cambered surface with said retractable pin and inserting said socket along said cambered portion into said sleeve such that said pin is engaged with said vertical groove, said socket being removable from said sleeve by aligning said pin with said eccentric groove and rotating said socket to a position where said pin opposes said tapered end and pulling upwards on said socket.

2. An apparatus, as claimed in claim 1, wherein said cross-member further includes:

a first and second brackets attachable to said first and second ends of said cross-member, respectively, said brackets being selectively adjustable in a horizontal and vertical direction to correspond to varying configurations of frame members and cargo beds of vehicles.

3. An apparatus, as claimed in claim 1, further including:

a transverse handle attached to said lower end of said socket, said socket being insertable into said upper end of said sleeve for storing said ball hitch when not in use, said socket being removable by pulling upwards on said transverse handle.

4. A trailer hitch assembly securable to a vehicle having a pair of parallel spaced frame members, said hitch comprising:

a cross-member having a first and second ends positionable between and attachable to said frame members, said cross-member further including an integral cylindrical sleeve and a resilient retaining means insertable therethrough;

a socket having an upper end, a lower end and an exterior surface, said socket further including a vertical groove and an intersecting eccentric groove formed on said exterior surface of said socket, said eccentric groove having a tapered end that is flush with said exterior surface, said socket being attachable to said cross-member by inserting said socket into said sleeve and engaging said retaining means with said vertical groove, said socket being removable from said sleeve by engaging said retaining means with said eccentric groove and pulling upwards on said socket when said retaining means opposes said tapered end; and a ball hitch member attached to said upper end of said socket, said ball hitch member being attachable to a trailer.

5. An apparatus, as claimed in claim 4, wherein:

said socket further includes a cambered surface formed on said lower end and aligned with said vertical groove, said cambered surface retracting said retaining means when said socket is inserted into said sleeve, said retaining means engaging said vertical groove when said retaining means moves past said cambered surface as said socket is further inserted therealong.

6. An apparatus, as claimed in claim 4, wherein:

said retaining means includes a pin and a biasing means attached thereto for resiliently urging said pin into said sleeve and into selective engagement with said vertical and eccentric grooves.

7. A trailer hitch assembly securable to a vehicle having a pair of parallel spaced frame members, said hitch comprising:

a cross-member having first and second ends and an opening formed in said cross-member between said ends, said cross-member positionable between and attachable to the frame members of the vehicle;

a socket having an upper end, a lower end and an exterior surface, said socket being insertable within said opening;

a first groove and an intersecting second groove formed on said exterior surface of said socket;

a retaining means transversely insertable into said opening for releasably securing said socket to said cross-member, said socket being securable by inserting said socket into said opening and engaging said retaining means with said first groove, said socket being releasable by engaging said retaining means with said second groove and pulling upwards on said socket; and a ball hitch attached to said upper end of said socket, said ball hitch being attachable to a trailer.

8. An apparatus, as claimed in claim 7, wherein:

said socket further includes a cambered surface formed on said lower end and aligned with said first groove, said cambered surface retracting said retaining means when said socket is inserted into said opening, said retaining means engaging said first groove when said pin moves past said cambered portion as said socket is further inserted therealong.

9. An apparatus, as claimed in claim 7, further including:

a first and second bracket attached to each end of said cross-member respectively, said brackets having horizontal and vertical adjusting means for selectively adjusting said brackets to correspond to varying configurations of frame members and cargo beds of vehicles.

10. An apparatus, as claimed in claim 7, wherein said socket further includes:

a transverse handle attached to said lower end, said socket being insertable at said upper end into said opening for storing said ball hitch when said hitch assembly is not in use, said socket being removable from said opening by pulling upwards on said transverse handle.

11. An apparatus, as claimed in claim 7, wherein:

said retaining means includes a pin and a biasing means attached thereto for resiliently engaging said pin into said opening and into selective engagement with said first and said second grooves.

12. An apparatus, as claimed in claim 7, wherein:

said first groove has a uniform depth and traverses said socket in a substantially vertical direction; and said second groove has a diminishing depth wherein one end of said second groove becomes flush with the exterior surface of said socket and traverses said socket in a substantially horizontal direction.

13. A trailer hitch assembly securable to a vehicle having a pair of parallel spaced frame members and a cargo bed mounted thereupon, said hitch comprising:

a cross-member with first and second ends and a ball socket protruding upwards therefrom;

first and second mounting brackets secured to each end of said cross-member respectively;

clamping means securable to each mounting bracket, said clamping means and said mounting brackets attachable to said frame members for releasably securing said hitch assembly to the frame members;

adjusting means for adjusting the position of said hitch assembly with respect to said frame members to accommodate varying frame members and cargo bed configurations, said adjusting means including:

a pair of horizontal slots formed on said mounting brackets and corresponding retaining bolts for selective adjustment of said brackets in a horizontal direction; and a pair of vertical slots formed on said mounting brackets and corresponding retaining bolts for selective adjustment of said brackets in a vertical direction.

14. A method for installing and removing a ball hitch used in a trailer hitch assembly, said method comprising the steps of:

inserting said ball hitch into said hitch assembly;

engaging said ball hitch to a locked position within said trailer hitch assembly by translation of said ball hitch in a linear direction in relation to said hitch assembly;

rotating said ball hitch within said hitch assembly to an unlocked position; and separating said ball hitch from said trailer hitch assembly by pulling away said ball hitch from said hitch assembly along said linear direction.

\* \* \* \* \*